US010712158B2

(12) United States Patent
Zaphir et al.

(10) Patent No.: US 10,712,158 B2
(45) Date of Patent: Jul. 14, 2020

(54) OPEN TERRAIN NAVIGATION SYSTEMS AND METHODS

(71) Applicant: Elbit Systems Land and C4I Ltd., Netanya (IL)

(72) Inventors: David Zaphir, Netanya (IL); Ido Ariav, Netanya (IL); Benny Goldman, Netanya (IL)

(73) Assignee: Elbit Systems Land and C4I Ltd., Netanya (IL)

( * ) Notice: Subject to any disclaimer, the term of this patent is extended or adjusted under 35 U.S.C. 154(b) by 0 days.

(21) Appl. No.: 15/758,039

(22) PCT Filed: Sep. 11, 2016

(86) PCT No.: PCT/IL2016/051008
§ 371 (c)(1),
(2) Date: Mar. 7, 2018

(87) PCT Pub. No.: WO2017/042821
PCT Pub. Date: Mar. 16, 2017

(65) Prior Publication Data
US 2018/0245922 A1    Aug. 30, 2018

(30) Foreign Application Priority Data

Sep. 9, 2015 (IL) .......................................... 241403

(51) Int. Cl.
*G01C 21/04* (2006.01)
*G01C 21/36* (2006.01)
(Continued)

(52) U.S. Cl.
CPC ........... *G01C 21/04* (2013.01); *G01C 21/005* (2013.01); *G01C 21/20* (2013.01);
(Continued)

(58) Field of Classification Search
CPC ...... G01C 21/04; G01C 21/005; G01C 21/20; G01C 21/3461; G01C 21/367;
(Continued)

(56) References Cited

U.S. PATENT DOCUMENTS 6,167,332 A * 12/2000 Kurtzberg ............ G05D 1/0274
318/568.12
10,043,130 B2 * 8/2018 Landau .................. G01C 21/26
(Continued)

FOREIGN PATENT DOCUMENTS

CN        101571401        11/2009

OTHER PUBLICATIONS

International Search Report of PCT Application No. PCT/IL2016/051008, dated Dec. 18, 2016.
(Continued)

*Primary Examiner* — Paula L Schneider
(74) *Attorney, Agent, or Firm* — Pearl Cohen Zedek Latzer Baratz LLP

(57) ABSTRACT

Navigation systems and methods are provided. A classifier is configured to transform a received image of a terrain into a classified image in which patches of pixels from the received image are represented as being in one of a specified number of material classes, each associated with respective terrain parameters. A physical traversability module is configured to determine, for the material parameters, a terrain topography and given vehicle parameters, a degree of traversability of the vehicle through the terrain as represented by the received image, to yield a traversability map. A routing module is configured to derive traversability measure(s) for route(s) through the classified image and with respect to the traversability map, between a given origin and a given destination or within a region with respect to a user-defined mission. A
(Continued)

graphical user interface is configured to display the route(s) according to the traversability measure(s).

16 Claims, 11 Drawing Sheets

(51) Int. Cl.
*G01C 21/34* (2006.01)
*G01C 21/00* (2006.01)
*G01C 21/20* (2006.01)
*G06K 9/00* (2006.01)
*G06K 9/62* (2006.01)
*G06T 17/05* (2011.01)

(52) U.S. Cl.
CPC ....... *G01C 21/3461* (2013.01); *G01C 21/367* (2013.01); *G06K 9/0063* (2013.01); *G06K 9/6267* (2013.01); *G06T 17/05* (2013.01); *G06T 2207/30181* (2013.01)

(58) Field of Classification Search
CPC .... G06K 9/0063; G06K 9/6267; G06T 17/05; G06T 2207/30181
USPC ....................................................... 701/428
See application file for complete search history.

(56) References Cited

U.S. PATENT DOCUMENTS

| | | |
|---|---|---|
| 2005/1019509 | 9/2005 | Ward et al. |
| 2007/0088469 A1* | 4/2007 | Schmiedel ........... G05D 1/0274 701/23 |
| 2008/0059015 A1 | 3/2008 | Whittaker et al. |
| 2014/0212055 A1* | 7/2014 | Boriah ................ G06K 9/0063 382/224 |
| 2014/0257621 A1* | 9/2014 | Zych .................. G01C 21/3453 701/25 |

OTHER PUBLICATIONS

Extended European Search Report for EP Application No. EP16843850.5, dated Apr. 18, 2019.

* cited by examiner

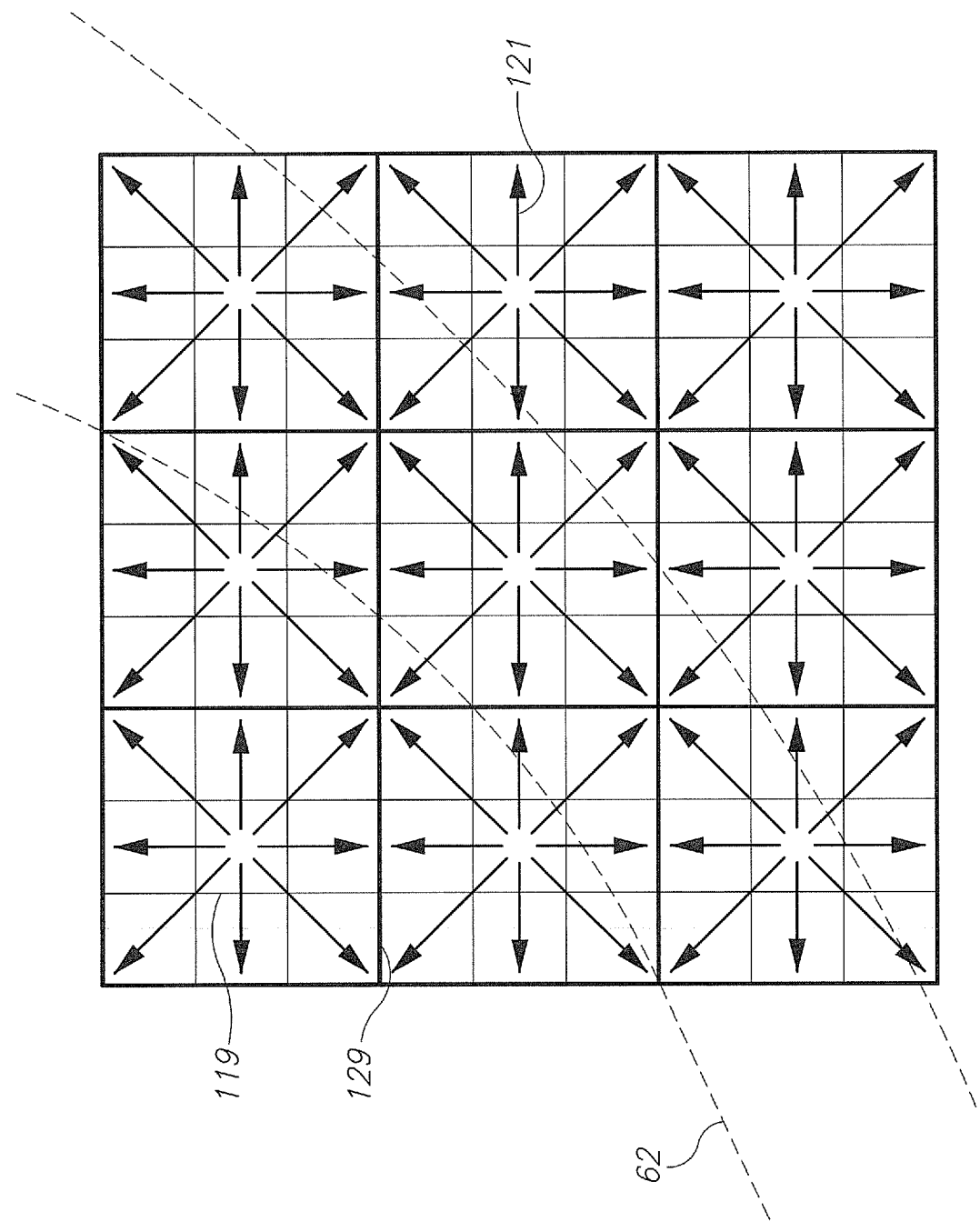

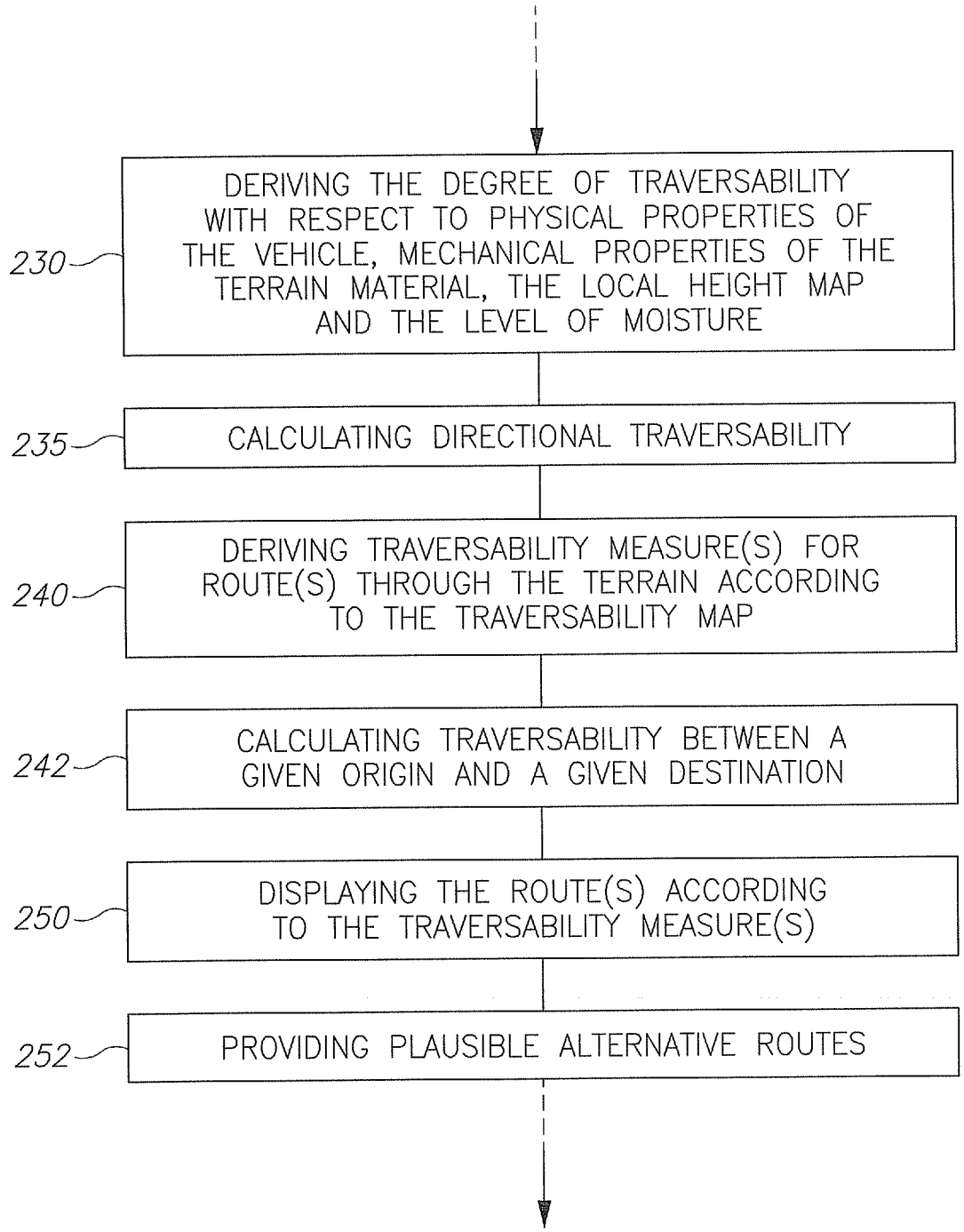
Figure 3 (cont. 1)

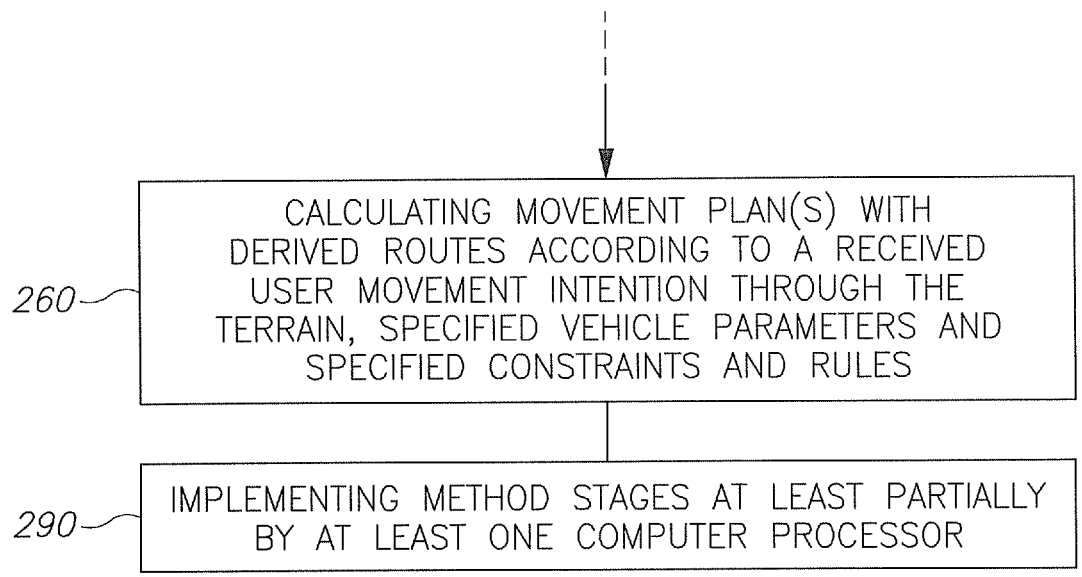
Figure 3 (cont. 2)

OPEN TERRAIN NAVIGATION SYSTEMS AND METHODS

CROSS-REFERENCE TO RELATED APPLICATIONS

This application is a National Phase Application of PCT International Application No. PCT/IL2016/051008, International Filing Date Sep. 11, 2017, entitled: "OPEN TERRAIN NAVIGATION SYSTEMS AND METHODS", published on Mar. 16, 2017 as International Patent Application Publication No. WO 2017/042821. This application also claims the priority of Israel Patent Application No. 241403, filed Sep. 9, 2015 which is hereby incorporated by reference in its entirety.

BACKGROUND OF THE INVENTION

1. Technical Field

The present invention relates to the field of navigation system, and more particularly, to navigation through a random terrain.

2. Discussion of Related Art

Navigating through a terrain, not being limited to roads and trails, is a significant challenge. Due to the large degree of variability in terrain parameters and interaction possibilities with the vehicle, and due to the large number of degrees of freedom, no efficient open terrain navigation system is currently known. Current systems necessarily handle predefined linear paths such as roads and trails.

SUMMARY OF THE INVENTION

The following is a simplified summary providing an initial understanding of the invention. The summary does not necessarily identify key elements nor limit the scope of the invention, but merely serves as an introduction to the following description.

One aspect of the present invention provides a navigation system comprising: a classifier configured to transform a received image of a terrain into a classified image in which patches of pixels from the received image are represented as being in one of a specified number of classes, wherein each class is associated with respective terrain parameters, a physical traversability module configured to determine, for the terrain parameters, a terrain topography and given vehicle parameters, a degree of traversability of the vehicle through the terrain as represented by the received image, to yield a traversability map, a routing module configured to derive at least one traversability measure for at least one route through the classified image and with respect to the traversability map and user constraints, between a given origin and a given destination and a graphical user interface configured to display, upon an image of the terrain, the at least one route according to the at least one traversability measure.

These, additional, and/or other aspects and/or advantages of the present invention are set forth in the detailed description which follows; possibly inferable from the detailed description; and/or learnable by practice of the present invention.

BRIEF DESCRIPTION OF THE DRAWINGS

For a better understanding of embodiments of the invention and to show how the same may be carried into effect, reference will now be made, purely by way of example, to the accompanying drawings in which like numerals designate corresponding elements or sections throughout.

In the accompanying drawings:

FIG. 2B is a schematic illustration of the traversability map laid upon the classified material map and including directional traversability indications, according to some embodiments of the invention.

DETAILED DESCRIPTION OF THE INVENTION

Figure 1A:
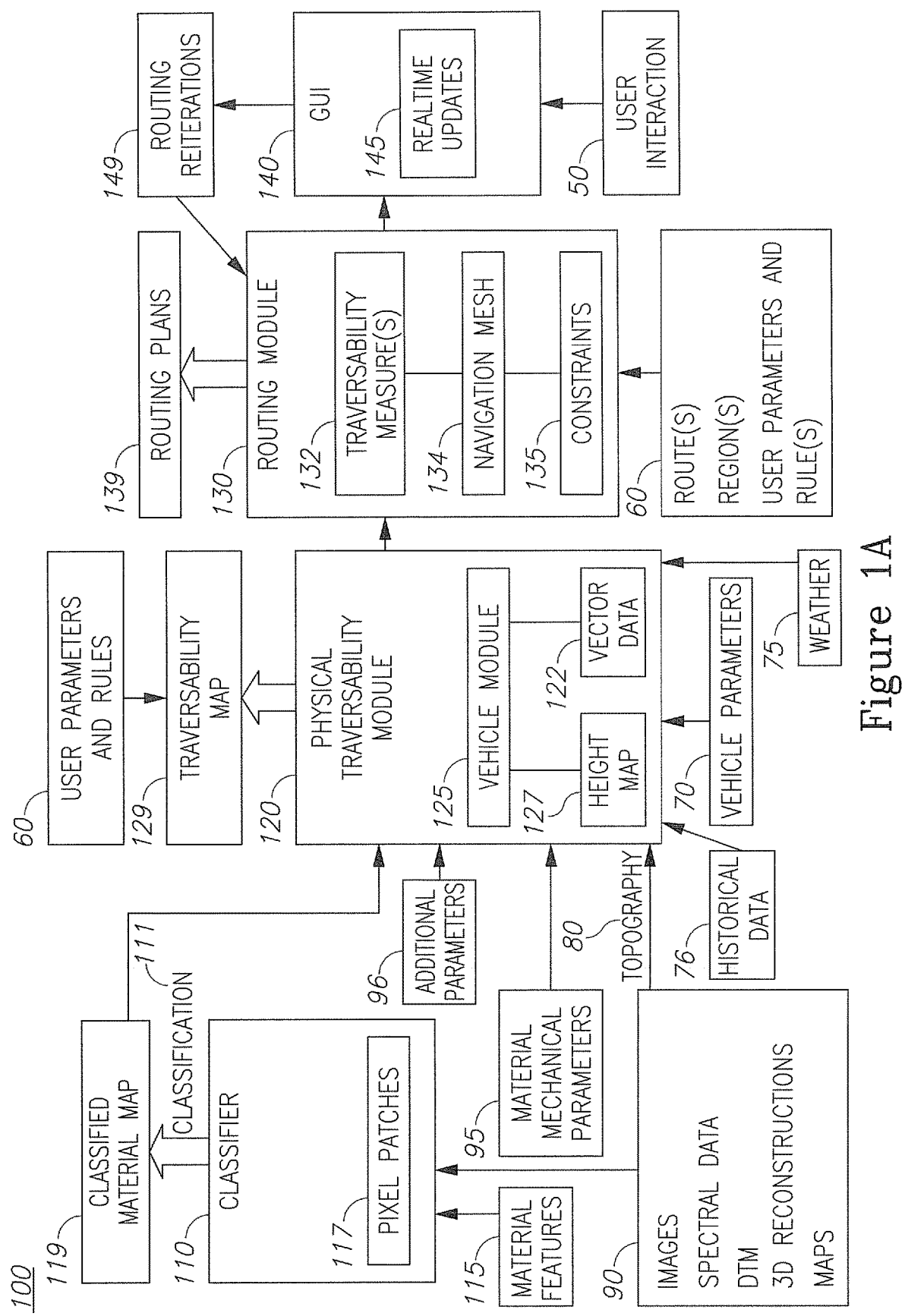
FIG. 1A is a high level schematic block diagram of a navigation system, according to some embodiments of the invention.

Prior to the detailed description being set forth, it may be helpful to set forth definitions of certain terms that will be used hereinafter.

The term "terrain" as used in this application refers to a generalized characterization of a spatial region, as may be reflected by a multitude of GIS (geographic information system) layers and elements applicable to the region, such as height map layers (e.g., DTM—digital terrain model layer, DSM—digital surface model layer etc.), images from different sources (e.g., as raster layers, such as aerial photos, multispectral imaging etc.), vector data (as a vector layer), data relating to materials in the region (material layer, e.g., geological, soil, vegetation and geomorphological maps) as well as other layers (referring e.g., to objects in the region, hydrological data, thermal imaging etc.).

The term "material" as used in this application refers to physical characteristics of locations in the region, especially but not exclusively to ground characteristics that are independent from the local topography and determine the interaction between vehicle wheels or tracks and the ground, such as the type of soil composition and its physical mechanical properties under different conditions. The term "material" is further used to refer to elements on the ground which determine traversability and are not ground materials, such as the type of vegetation and objects on the ground such as roads, houses, etc. The term "material features" as used in this application refers to characteristics of different materials which can be represented by image data of different types, while the term "material mechanical characteristics" as used in this application refers to characteristics of different materials which are involved in determining the interaction between vehicles and the different materials.

With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

Before at least one embodiment of the invention is explained in detail, it is to be understood that the invention is not limited in its application to the details of construction and the arrangement of the components set forth in the following description or illustrated in the drawings. The invention is applicable to other embodiments or of being practiced or carried out in various ways. Also, it is to be understood that the phraseology and terminology employed herein is for the purpose of description and should not be regarded as limiting.

Figure 1B:
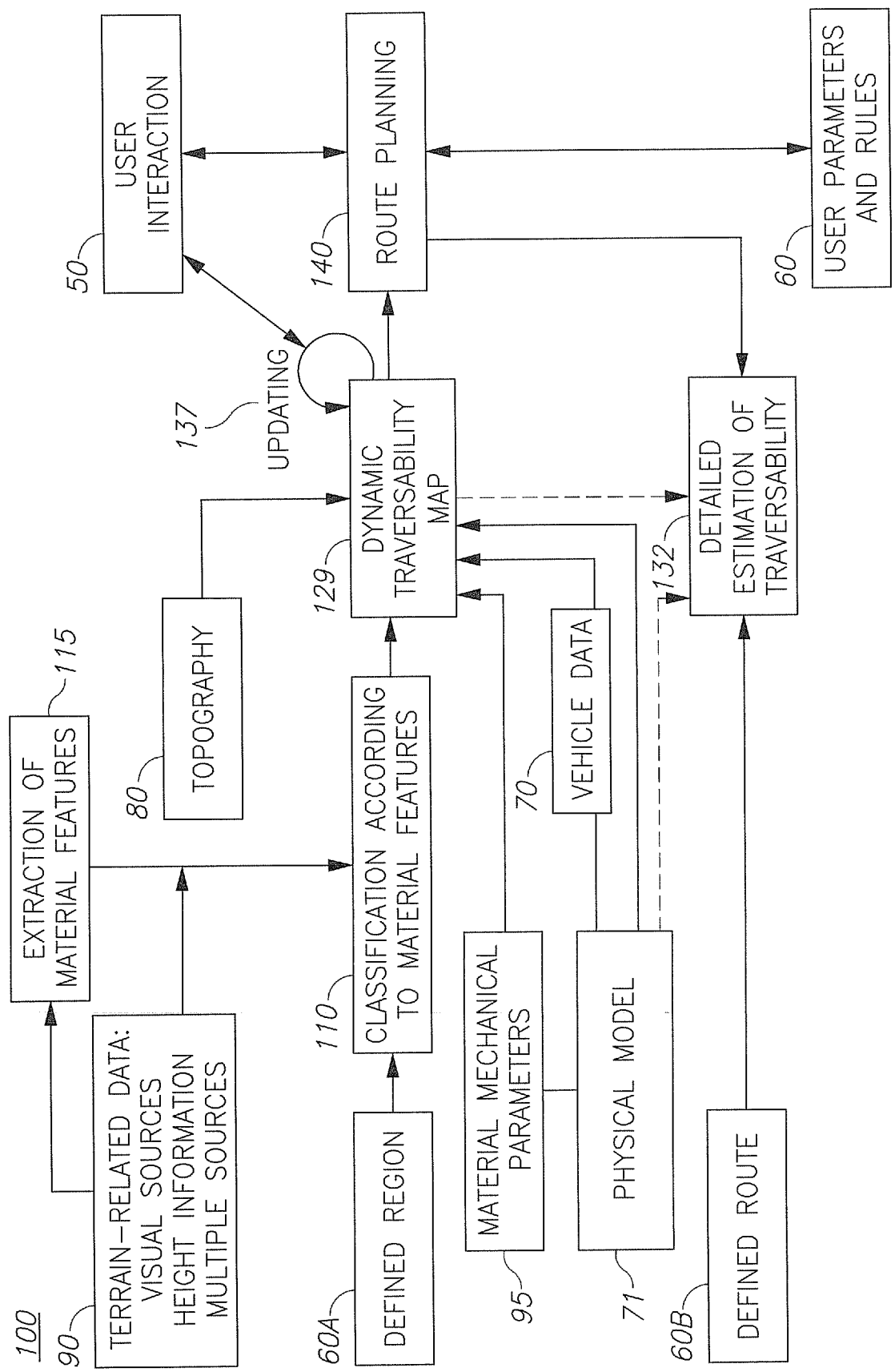
FIG. 1B is a high level schematic illustration of exemplary information flow through the navigation system, according to some embodiments of the invention.

FIG. 1A is a high level schematic block diagram of a navigation system 100, according to some embodiments of the invention. FIG. 1B is a high level schematic illustration of exemplary information flow through navigation system 100, according to some embodiments of the invention. Any part of navigation system 100 may be implemented at least partly using at least one computer processor. Navigation system 100 combines image processing abilities with a physical traversability model to enable sophisticated route selection and navigation in any terrain, not limited to roads and ways.

Navigation system 100 comprises at least one of a physical traversability module 120, a routing module 130, a graphical user interface (GUI) 140 and optionally a classifier 110, which may be interconnected by wire or wireless, and may be connected via a communication link of any type. Modules 120, 130 and 140 may be operated independently of each other, possibly as standalone module, or within unified navigation system 100. Different components of the modules may be physically located at different locations, e.g., heavy computations may be carried out by a central server, while local calculations may be carried locally. Any part of the operation of the modules may be parallelized using multiple processors.

Classifier 110 may be configured to provide material mechanical parameters 95 to physical traversability module 120 by transforming terrain-related data 90 into a classified representation 111 of a terrain in terms of a specified number of classes, each class being associated with respective material mechanical parameters. Classifier 110 be part of system 100 and/or may also be operated independently as a standalone module. It is noted that material mechanical parameters are physical characteristics of locations in the region, relating especially but not exclusively to ground characteristics that are independent from the local topography and determine the interaction between vehicle wheels or tracks and the ground, such as the type of soil composition and its physical mechanical properties under different conditions. The material mechanical parameters may refer to any parameters that determine traversability, such as the type of vegetation and objects on the ground such as roads, houses, etc. Material mechanical parameters 95 may comprise any type of materials and compositions as well as various objects in the terrain, including terrain constructive parameters which define the constructive behavior of the ground during dynamic interaction with a vehicle. Material mechanical parameters 95 may be derived from geological analysis as well as from experimental studies.

The material types are also characterized by corresponding material features 115, which are characteristics of the materials that may be derived from various sources of information, such as optical parameters, hyperspectral data, radar information, height information etc. The material features may be used to generally characterize a terrain of a spatial region in terms of the materials it is composed of, using a multitude of GIS (geographic information system) layers and elements applicable to the region, such as height map layers (e.g., DTM—digital terrain model layer, DSM—digital surface model layer etc.), images from different sources (e.g., as raster layers, such as aerial photos, multi-spectral imaging etc.), vector data (as a vector layer), data relating to materials in the region (material layer, e.g., geological, soil, vegetation and geomorphological maps) as well as other layers (referring e.g., to objects in the region, hydrological data, thermal imaging etc.). Material mechanical parameters 95 may be associated with material types and/or with material features 115, and may be derived from the terrain representation, or from defined terrain types, according to an analysis of data from these sources. It is noted that any material may be characterized according to its properties which are sensed as material features 115 (e.g., its optical features) as well as by its properties which are related to its mechanical parameters 95 (e.g., grain size, hardness, density etc.). The correlation between material features 115 and mechanical parameters 95 for each material may be utilized to derive traversability measures (by physical traversability module 120 using material mechanical parameters 95) according to the classification of the terrain (by classifier 110 using material features 115).

Terrain-related data 90 may comprise at least one of a received image, geological and/or ground maps, three dimensional (3D) reconstruction data, DTM, a heights map (e.g., DTED—Digital Terrain Elevation Data), infrared data, multispectral data, hyperspectral data, lidar data (as part of a 3D reconstruction), radar data, synthetic aperture radar (SAR) data and vector data relating to the terrain as well as GIS (geographic information system) data.

In certain embodiments, terrain-related data 90 may comprise at least a received image 90. Received image 90 may comprise realtime imaging data, realtime images and/or a plurality of images taken prior to actual navigation. Received image 90 may comprise or be enhanced by any type of image data, e.g., hyperspectral data, 3D reconstruction data, infrared data, radar data etc.

As schematically illustrated in FIG. 1B, terrain-related data 90 may be used to extract material features 115 and then be classified 110 (e.g., by applying machine learning algorithms) according to material features 115 with respect to a user defined region 60A. Traversability map 120 may be constructed with respect to classification 110, material mechanical parameters 95, topography 80 and vehicle data 70, e.g., using a physical model 71 that connects vehicle parameters with material mechanical parameters and other parameters to yield traction and traversability data. Traversability map 120 may then be used for route planning 140 under user parameters and rules 60 and possibly involving user interaction 50, for estimation of traversability of user-defined route(s) 60B and/or for estimation of traversability of planned routes 140, e.g., for different vehicles or under changing circumstances (such as weather changes or interventions related to the terrain). In the latter case, traversability map 129 may be partly or fully updated 137, possibly implementing different updating periods according to the extent or priority of the changes. Traversability map 120 may be calculated at different resolution for different types of vehicles. Traversability map 120 may be dynamic in the sense that at least parts or elements of traversability map 120 may be modified in real time or close to real time and according to accumulating information from vehicles moving through the terrain and from other sources. User interaction 50 may also be involved in the dynamic updating of traversability map 120. Alternatively or complementarily, traversability map 120 and/or physical model 71 may be used to create a direct and detailed estimation of traversability 132 along user-defined route(s) 60B and/or points thereof. Physical model 71 may be optimized to handle real time physical complex calculations.

In certain embodiments, classifier 110 may be used for analyzing terrain as a standalone module, e.g., for analyzing terrain for checking landing requirements, for simulating visual aspects of the terrain, e.g., of imaging the terrain from different directions and at different wavelength ranges, for simulating three dimensional scenes based on the classification etc. These applications may rely on common features of the material classes which may be related to parameters required to derive the applications listed above.

Figure 2A:
FIG. 2A schematically presents an exemplary classified terrain map, according to some embodiments of the invention.

In certain embodiments, classifier 110 may transform a received image 90 of the terrain into a classified image 119 (e.g., a materials' map) as the classified representation of the terrain, in which patches of pixels 117 from received image 90 are represented as being in one of a specified number of classes, wherein each class is associated with respective material features 115, associated with respective material mechanical parameters 95, as schematically illustrated in FIG. 2A, being an exemplary classified material layer 119, according to some embodiments of the invention. The classified representation of the materials in the terrain may comprise image 119 in which patches 117 of pixels from received image 90 are represented as being in one of the specified number of classes. For example, different material classes according to corresponding material features 115, may relate to different types of terrain and soil (e.g., limestone, dolomite rocks, gravel, sand, loam, clay, silt and intermediate degrees, compositions and vertical compositions, as well as water, snow etc.), different types of vegetation (e.g., bare, low shrubbery, high shrubbery, trees), different morphological structures (e.g., micro-topographical features such as size of boulders, step structures, stony structures, flat surface etc.) and objects and structures (e.g., vehicles, roads, houses). In certain embodiments, classifier 110 may further comprise a capability of automatic classification of materials types and the morphological structures, or any other aspect as explained above.

In certain embodiments, classifier 110 or an additional module (not shown) may be configured to define material features 115 by applying to the terrain-related data machine learning procedures such as supervised classification algorithms (e.g., support vector machines, SVMs) or non-supervised procedures. Materials training data may be provided for applying the machine learning procedures, e.g., a small part of the terrain may be classified manually and used to as materials training data. Any of the following aspects of the terrain-related data may be used for the machine learning procedures: Features of aerial imagery such as color, brightness, texture filters, etc.; Digital Terrain Elevation Data (DTED) such as normal maps, local minima and maxima, etc.; spectral signatures derived from multi spectral and/or hyper spectral information; various types of vector data (e.g., roads, rivers, buildings); and information from 3D reconstructions (e.g., imagery, height map features). The classification may be probabilistic, with probabilities assigned to each pixel patch with respect to the different material features and classes. The classification may be iterative, and the number and types of classes may be updated during classification.

Figure 2C:
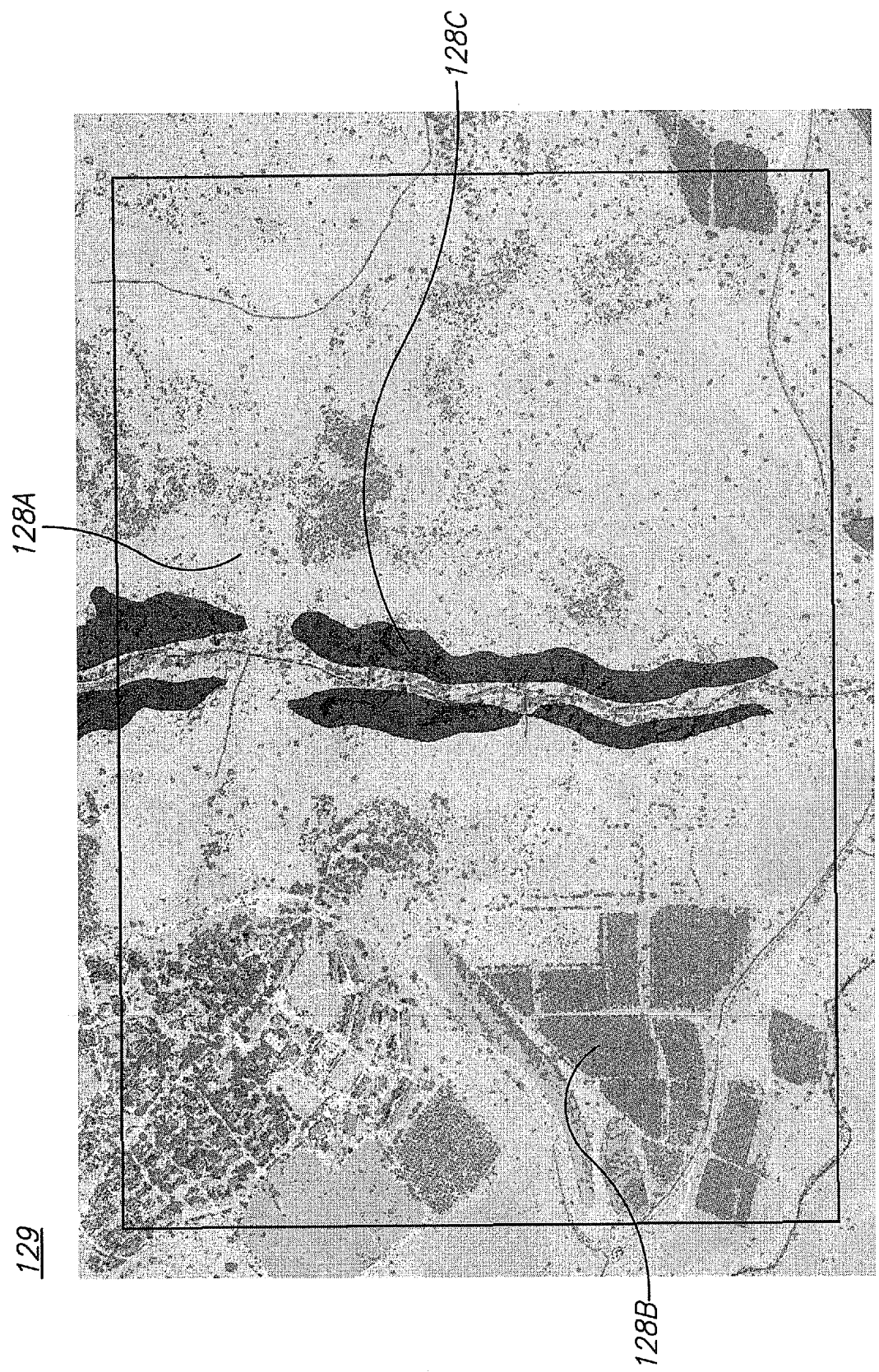
FIG. 2C schematically presents an exemplary traversability map, according to some embodiments of the invention.

Physical traversability module 120 may be configured to determine, for classified representation 111 with or without material features 115, a terrain topography 80, optionally vector data 122, optionally historical data 76 and given vehicle parameters 70 (e.g., vehicle dynamic parameters), a degree of traversability of the vehicle through the terrain as represented by classified material map 119 and/or by received image 90, to yield a traversability map 129 as schematically illustrated in FIG. 2C, being an exemplary traversability map 129, according to some embodiments of the invention. Traversability map 129 may comprise e.g., traversable regions 128A (absolutely or with respect to given vehicle parameters 70, e.g., a flat region with stable soil), partly traversable regions 128B (depending on given vehicle parameters 70, e.g., a plantation) or hardly traversable/untraversable regions 128C (e.g., deep ditches or cliffs). The degree of traversability may relate to vehicle parameters 70, topography 80 at large and small scales (an example for the latter—dimensions and characteristics of steps), weather 75 and may be modified in realtime, e.g., by heavy equipment such as a bulldozer or an excavator.

Vector data 122 may comprise additional information about the terrain, such as artificial obstacles, different underground objects, later artificial changes to the imaged terrain and other data which may be overlaid over the image data. Vector data 122 may relate to physical traversability and/or to total traversability (i.e., including non-physical aspects of traversability, which may thus be incorporated into traversability map 129). Historical data 76 may comprise historical traversability data, as well as data concerning changes in the terrain that have taken place since the images and information used to prepare classified material map 119 were collected. Additional parameters 96 that may be used by physical traversability module may comprise specific constraints on mobility which are external to the material categories, dynamic changes in certain data etc. Further examples for additional parameters 96 may comprise fine scale parameters of the materials which may be difficult to sense, or may change dynamically, such as soil density, soil compaction, soil humidity etc.

In certain embodiments, physical traversability module 120 may be further utilized to assess the forces applied to the driver and passengers of the vehicles, and their movements within the vehicle (taking into account the vehicles' suspension systems), e.g., using multi-body dynamic models. The applied forces and movements may also be used to augment the estimation of traversability and the route selection (as some paths may be traversable for the vehicle but not to the passengers with the vehicle, under given physiological constraints). User parameters and rules 60 may be used to enhance traversability map 129, concerning e.g., restrictions concerning passengers well-being and operational requirements that pose additional limitations on traversability beyond the mere vehicular traversability.

FIG. 2B is a schematic illustration of traversability map 129 laid upon classified material map 119 and including directional traversability indications, according to some embodiments of the invention. Physical traversability module 120 may be configured to derive directional traversability information which indicates the traversability of a location in different directions, indicated schematically by arrows 121. The directional traversability information may be used to enhance the estimation of traversability along a route, and may be used to suggest preferred approaching directions. The inventors note that in case of a prominent terrain feature 62, such as a ditch, a road, a fence, etc., the directional traversability information may correspond to the natural direction of propagation along terrain feature 62 and thus may be used to enhance the navigation mesh derivation and the route calculations. Moreover, in locations which are difficult to traverse, the directional traversability information may be used to provide fine scale movement suggestions. The directional traversability information in traversability map 129 may be used to relate to side slopes in traversability estimations and in route planning.

Vehicle parameters 70 may comprise vehicle type(s), vehicle performance parameters, vehicle geometry, suspension system, type and parameters of powertrain and other vehicle mechanical parameters, as well as vehicle behavior models 125 with respect to material mechanical parameters 95. Physical traversability module 120 may be further configured to receive weather data 75 either from the user or from external sources to update the degree of traversability of the vehicle through the terrain accordingly. Multiple traversability maps 129 may be generated according to multiple vehicle types.

Terrain topography 80 may comprise height map 127 of the terrain vertical features according to which, in relation to material features 115, corresponding material mechanical parameters 95 and vehicle parameters 70—the degree of traversability may be calculated.

In certain embodiments, traversability map 129 may be at least partly vectorial in the sense that it depends on the directions of approach and departure of the vehicle to and from points or regions on map 129, respectively. Traversability map 129 may comprise data relating to possible directions of approach and possible movement directions at specific points or regions and along specific regions of the terrain. Respectively, traversability measure(s) 132 may comprise directional elements indicating possible or preferred directions of motion. For example, traversability may be different for descending a hill versus climbing the same hill (depending on vehicle parameters 70), movement along channels, canals and ditches may be easier than movement across these elements etc. Furthermore, traversability map 129 may represent the existence of local fine scale topography and abrupt changes such as steps in the terrain and physical traversability module 120 may be configured to determine the possibility of traversing these features and respective traversal directions according to the physical terrain and vehicle models. Traversability map 129 may hence incorporate local height information at least in certain regions or points characterized by abrupt changes.

Physical traversability module 120 may be at least partially be based on experimental data collected for different vehicle parameters 70, such as vehicle physical and mechanical parameters, most of which may be provided by the vehicle manufacturer. Some of the parameters, e.g., mechanical parameters such as spring coefficients, or functional parameters such as vehicle behavior parameters under different conditions, may be derived experimentally); and with respect to material mechanical parameters 95 at different slopes in height map 127 or slope simulations and under different weather conditions, especially concerning the soil's degree of wetting. Traversability map 129 may be calculated pixel for pixel in image 90, wherein each pixel is associated with it specific material features 115. A compound map, including both classified image as material map 119 and traversability map 129 may be used for routing. In certain embodiments, traversability map 129 may be interpolated or be calculated into a continuous function of the image coordinates. In certain embodiments, the degree of traversability may be binary, i.e., indicating whether the given vehicle can traverse a give route, or reach the destination from the origin, or not. It is noted that traversability map 129 may comprise physical traversability data and be further enhanced by dynamic traversability relevant information such as changes in objects associated with the terrain (e.g., roads, bridges, tunnels, buildings and various potential or actual obstructions).

In certain embodiments, physical traversability module 120 may be configured to calculate the degree of traversability as traversability measure 132 for a given route without calculating full traversability map 129, e.g., to reduce computing time or required resources. Route validation may be carried out by applying a full physical simulation of motion to whole route 139 provided by the user. In certain embodiments, physical traversability module 120 may be configured to provide detailed route information such as the speed and acceleration limitations, as well as other parameters related to the physicality of motion such as effects on passengers, at every waypoint along route 139 as part of estimation of traversability 132, based on vehicle physical and geometrical properties in vehicle model 125, topography 80, classification 111 and optionally weather conditions 75. The detailed route information may be provided at different levels of resolution, depending on the type of vehicle and user definitions.

Figure 2D:
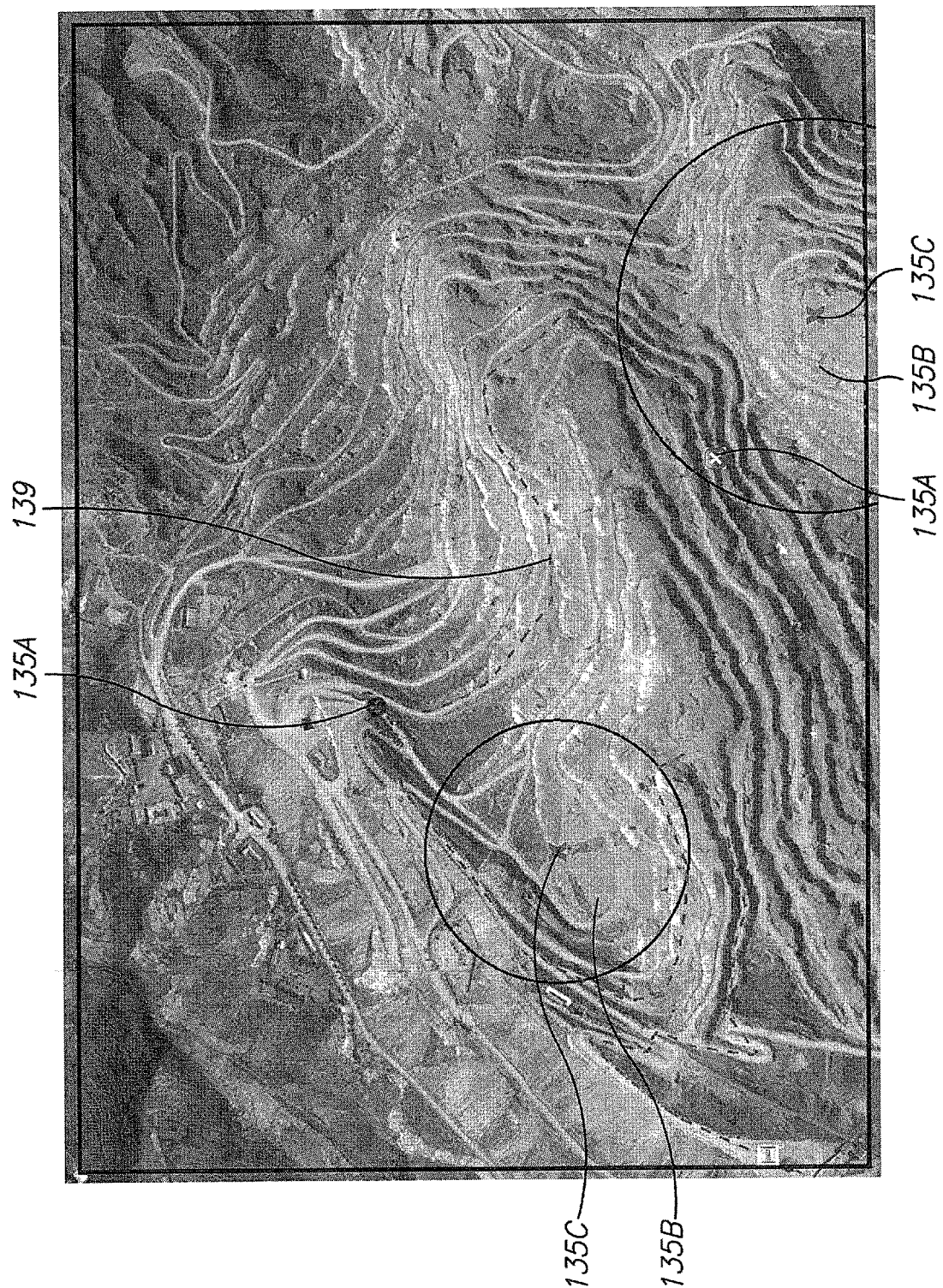
FIG. 2D schematically presents an exemplary routing plan, according to some embodiments of the invention.

Routing module 130 may be configured to derive at least one traversability measure 132 for at least one route 139 through the terrain and with respect to traversability map 129, between a given origin and a given destination. For example, FIG. 2D schematically presents an exemplary routing plan 139, according to some embodiments of the invention. In the illustrated case, routing plan 139 may be determining based solely on topography 80 as other terrain parameters are not significantly limiting. Routing module 130 may be configured to handle constraints 135 such as artificial rules, operational considerations, regions to be avoided etc. In certain embodiments, constraints 135 may comprise avoiding observed regions and routing module 130 may be configured to carry out line of sight calculations for planned routes 139 and generate suggested routes according to detection criteria. For example, in FIG. 2D, constraints 135 (possibly as user-defined parameters and rules 60) are illustrated such as points 135A along the route which must be traversed and requirements to avoid certain areas 135B which are observable from certain points 135C. It is noted that intervisibility between points on route 139 and specific point of the terrain or points outside or above the terrain may be specified as used defined rules 60. For example, the line of sight calculations may be applied to traversability map 129, e.g., by marking each pixel as seen or unseen (possibly with relation to any additional parameters such as other elements related to the terrain and their capabilities). User defined rules 60 may comprise respective definitions as well as their influence on the traversability (e.g., on traversability measure(s) 132), which may thus be accounted for in the optimal route calculation algorithm.

Routing module 130 may be configured to derive one or more optimal routes 139 with respect to traversability map 129 and user definitions. Routing may be carried out according to any type of user definition 60, e.g., specific route (in which case routing module 130 may estimate traversability and possibly suggest route corrections), origin and destination, movement region and possibly additional user parameters such as regions to be avoided, special traversability remarks as well as definitions regarding groups of vehicles of different types, for which corresponding routes are planned by routing module 130. User definition 60 may be mission oriented, i.e., define vehicle movements and constraints according to a given mission. In certain embodiments, route 139 may be a single user-specified route for which system 100 calculates traversability measures 132, possibly providing an increased level of scrutiny with respect to specific points or regions along route 139 in which traversability measure 132 is small and/or specified user defined rules apply. It is noted that routing module 130 may be configured to derive long range routes 139, and in that differ from local routing applications which merely take the vehicle's immediate surroundings into account when routing the vehicle.

In certain embodiments, routing module 130 may be configured to derive a navigation mesh 134 from traversability map 129 to enable effective route planning with respect to computing resources and to provide an effective platform for applying traversability updates 137 quickly. Navigation mesh 134 may group regions in traversability map 129, incorporate vector data and provide effective route alternatives (see below) and route adaptations to vehicle types and parameters 70 when required. In certain embodiments, navigation mesh 134 and/or traversability map 129 may have a hierarchical structure to enable quick updating and rout planning.

In certain embodiments, routing module 130 may be configured to suggest possible user interventions to improve traversability, e.g., at points which are critical to the routing (e.g., in which a small traversability change may allow a large improvement of the routing). In certain embodiments, routing module 130 may be configured to suggest possible user maneuvers at such critical points to enhance the ability of the vehicles to traverse the corresponding planned route.

It is noted that classification 110 and possibly the construction of traversability map 129 may be carried out offline, with only updating traversability map 129 and routing being carried out in realtime. In certain embodiments, parts of routing may also be carried out offline.

Graphical user interface (GUI) 140 may be configured to display, upon an image of the terrain, route(s) 139 according to traversability measure(s) 132. (It is noted that GUI 140 may indicate that no routes 139 are possibly at given circumstances.) GUI 140 may be further configured to receive user interactions 50 such as changes in and addition to user definitions 60 and provide respective realtime updates from routing model 130. In certain embodiments, much, most or all of the computational effort of classifier 110 and physical traversability module 120 may be carried out in advance of user interaction and serve as a dynamic database for routing plan calculations by routing module 130. In certain embodiments, GUI 140 may be configured to indicate possible user interventions to make certain critical regions more traversable to enable more efficient routing of the vehicles. Hence, routing may be made iteratively 149 according to user indications. In certain embodiments, GUI 140 may comprise a movement planner, configured to receive a user movement intention through the terrain and suggest a movement plan comprising a plurality of routes derived by the routing module with respect to specified vehicle parameters and specified constraints. It is noted that constraints 135 may comprise user defined constraints as well as algorithmic constraints such as requirements for local optimization, sensibility of route, minimum overlap between alternative etc. (and see FIG. 2F below).

User interactions 50 may comprise data from sensors on a user vehicle moving along planned route 139. In certain embodiments, traversability map 129 and/or route plan 139 may be updated with the recorded data. In certain embodiment, realtime aerial images and/or realtime 3D reconstructions may be used to update image 90 and the information derived therefrom.

In certain embodiments, navigation system 100 may enable navigation at low visibility or no visibility conditions by providing received image 90 and routes 139 and following vehicle movements e.g., by GPS signals.

Figure 2E:
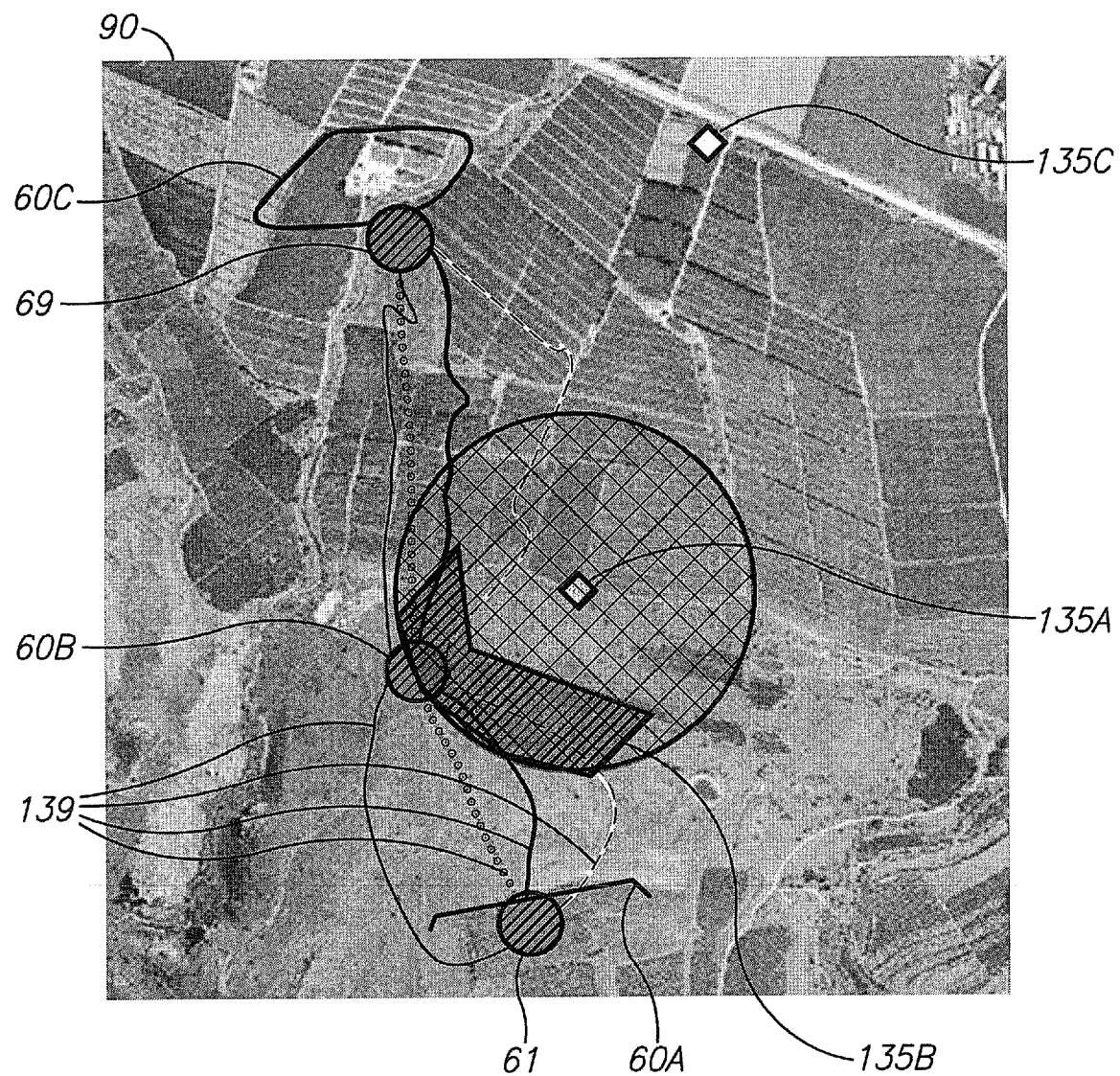
FIG. 2E schematically presents an exemplary GUI image, user definitions and corresponding routing plans, according to some embodiments of the invention.

FIG. 2E schematically presents an exemplary GUI image 140 and respective user definition 60, according to some embodiments of the invention. Based on received image 90, the user may indicate points of origin 61, destination 69 and intermediate route indications, for example parameters 60A relating to origin 61 and vehicles at origin 61; parameters relating to waypoints 60B and constraints 135 related to them such as region 135A which should be possibly avoided (e.g., due to being observed), region 135B which is preferred for movement (e.g., as being occluded from the observer of region 135A) or region 135C which may affect vehicles along the planned routes; and parameters 60C relating to destination 69 such as size indication of destination 69 which embodies a degree of freedom in route planning. GUI 140 may present different calculated routes 139 and indicate different parameters relating to these routes (e.g., different traversability measures, respective vehicles which may traverse each route, relation of the routes to user definitions etc.).

Figure 2F:
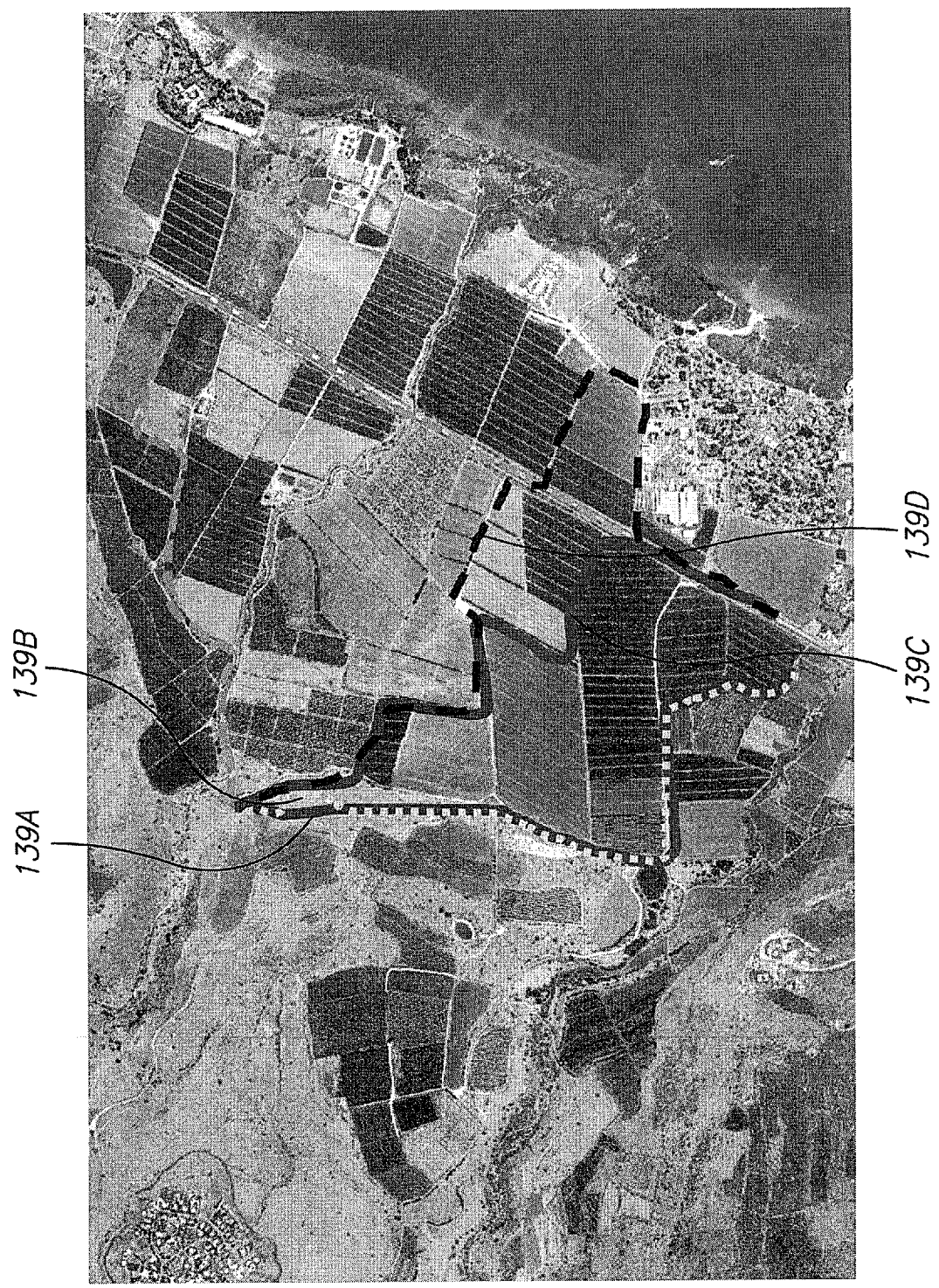
FIG. 2F schematically presents an example for alternative routing plans, according to some embodiments of the invention.

FIG. 2F schematically presents an example for alternative routing plans 139, according to some embodiments of the invention. Routing module 130 may be configured to define plausible route alternative 139 to provide meaningful information to the user. For example, given route 139A, alternative route 139B which differs from route 139A only slightly may be considered irrelevant, which route alternative 139C may provide the user with a significant alternative to route 139A. Moreover, route alternative 139D may be considered a non-sustainable alternative to route 139C at it is merely longer without any added value with respect 139C (assuming there is no constraint 135 which provides route 139D with an advantage with respect to route 139C). Routing module 130 may apply learning algorithms to be able to distinguish among the potentially numerous alternative routes 139 and provide the user with significant alternative routes 139.

Figure 3:
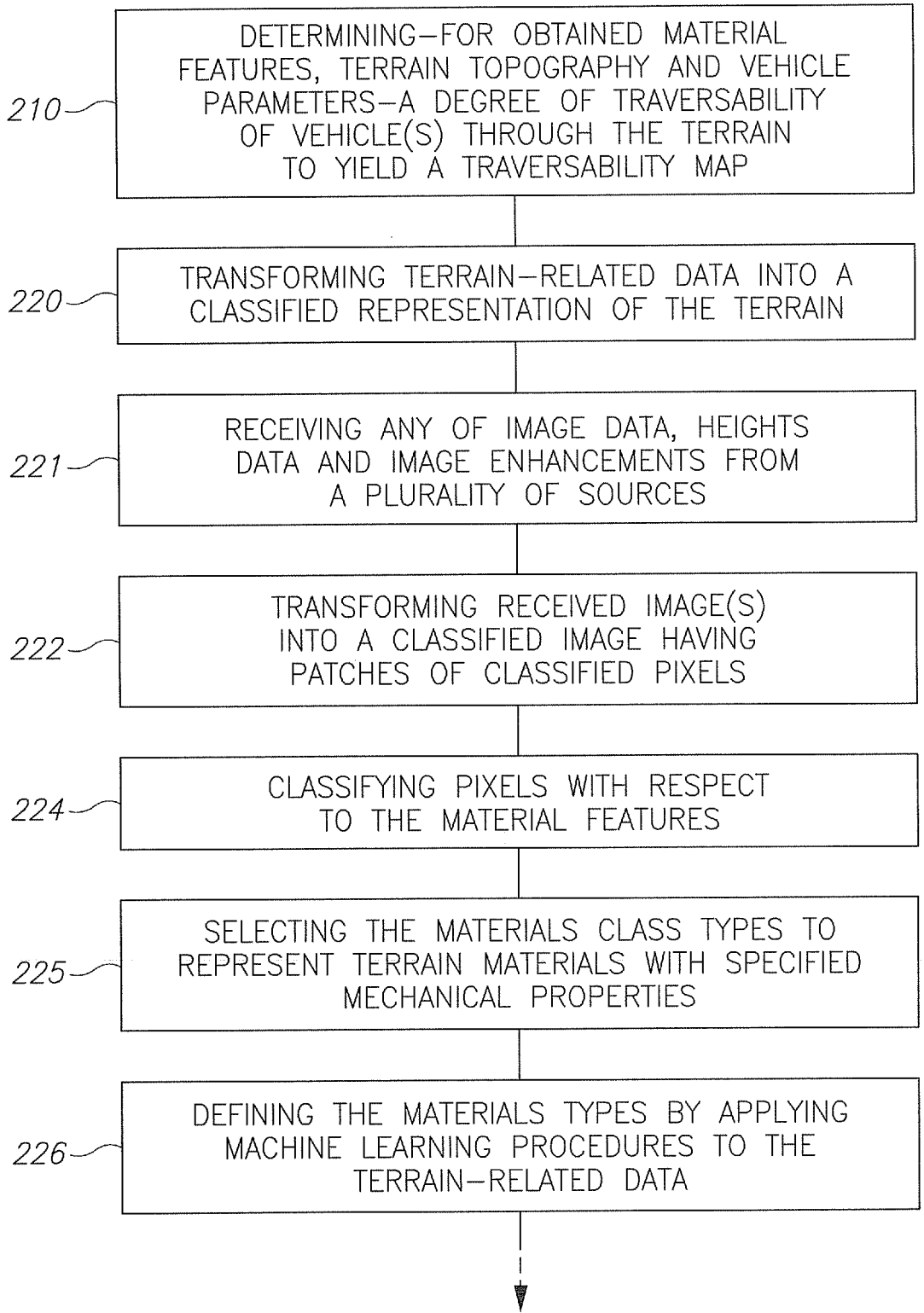
FIG. 3 is a high level schematic flowchart illustrating a method, according to some embodiments of the invention.

FIG. 3 is a high level schematic flowchart illustrating a method 200, according to some embodiments of the invention. Stages of method 200 may be at least partially implemented by at least one computer processor (stage 290).

Method 200 may comprise determining—for obtained material features, terrain topography and given vehicle parameters—a degree of traversability of the vehicle through the terrain as represented by the received image, to yield a traversability map (stage 210). Method 200 may further comprise transforming terrain-related data into a classified representation of the terrain (stage 220). The terrain-related data may comprise, e.g., any of a received image, three dimensional reconstruction data, a heights map (e.g., DTED—Digital Terrain Elevation Data), any type of GIS (geographic information system) layer, infrared data, hyperspectral data, radar data, synthetic aperture radar (SAR) data and vector data relating to the terrain. The classification may be carried out according to material classes that are related to material features that are associated with respective material mechanical parameters.

Method 200 may further comprise receiving any of image data, heights data, image enhancements etc. from a plurality of sources (stage 221). For example, when the terrain-related data comprises at least one received image, method 200 may comprise transforming received image(s) of the terrain into a classified image having patches of classified pixels (stage 222) by classifying a plurality of captured image pixels (e.g., patch-wise) with respect to a specified number of classes, each class associated with respective material features (stage 224).

Method 200 may further comprise selecting the material classes to represent terrain materials with specified mechanical properties (stage 225). For example, method 200 may comprise defining the materials' types by applying machine learning procedures to the terrain-related data (stage 226).

Method 200 may further comprise deriving the degree of traversability with respect to physical properties of the vehicle, mechanical properties of the terrain material, a local height map and a level of moisture (stage 230). Certain embodiments comprise calculating directional traversability (stage 235), e.g., calculating the degree of traversability as a vectorial traversability measure which depends on the direction the vehicle approaches each respective point or path on the traversability map. Hence, Method 200 may take into account vehicle parameters with respect to opposite inclinations when approaching a point from opposite directions, or generally different inclination angles depending on the angle of approach to each point or region on the traversability map.

Method 200 may comprise deriving at least one traversability measure for at least one route through the terrain and with respect to the traversability map (stage 240), e.g., between a given origin and a given destination (stage 242), or for multiple routes associated with multiple, possibly different vehicles. The traversability measure may be derived for a specific, user inputted route and in such cases may involve modelling the route at a high resolution and inspect certain parts of the route indicated by the user or identified by method 200 to be potentially of low traversability.

Method 200 may comprise displaying, e.g., upon an image of the terrain, the route(s) according to the traversability measure (s) (stage 250). In certain embodiments, method 200 may further comprise calculating a movement plan with derived routes according to a received user movement intention through the terrain, specified vehicle parameters and specified constraints and rules (stage 260).

In the above description, an embodiment is an example or implementation of the invention. The various appearances of "one embodiment", "an embodiment", "certain embodiments" or "some embodiments" do not necessarily all refer to the same embodiments.

Although various features of the invention may be described in the context of a single embodiment, the features may also be provided separately or in any suitable combination. Conversely, although the invention may be described herein in the context of separate embodiments for clarity, the invention may also be implemented in a single embodiment.

Certain embodiments of the invention may include features from different embodiments disclosed above, and certain embodiments may incorporate elements from other embodiments disclosed above. The disclosure of elements of the invention in the context of a specific embodiment is not to be taken as limiting their used in the specific embodiment alone.

Furthermore, it is to be understood that the invention can be carried out or practiced in various ways and that the invention can be implemented in certain embodiments other than the ones outlined in the description above.

The invention is not limited to those diagrams or to the corresponding descriptions. For example, flow need not move through each illustrated box or state, or in exactly the same order as illustrated and described.

Meanings of technical and scientific terms used herein are to be commonly understood as by one of ordinary skill in the art to which the invention belongs, unless otherwise defined.

While the invention has been described with respect to a limited number of embodiments, these should not be construed as limitations on the scope of the invention, but rather as exemplifications of some of the preferred embodiments. Other possible variations, modifications, and applications are also within the scope of the invention. Accordingly, the scope of the invention should not be limited by what has thus far been described, but by the appended claims and their legal equivalents.

What is claimed is:

1. A navigation system through a terrain, the system comprising:
    at least one sensor mounted on a vehicle and configured to capture terrain-related data,
    a classifier configured to receive a terrain-related data comprising at least one image of a terrain and to determine, based on the at least one image of the terrain, at least one classified image of the terrain comprising multiple patches of classified pixels, wherein each patch of classified pixels of the multiple patches of classified pixels is represented as a specific class of a specified number of classes associated with predetermined physical parameters of the respective class;
    a physical traversability module configured to
        generate, based on the at least one classified image of the terrain, a terrain topography, given vehicle dynamic parameters, and, using a predetermined vehicle physical dynamic model comprising vehicle behavior patterns associated with the physical parameters, a vectorial dynamic physical traversability map of the terrain comprising physical traversability measures of the vehicle at specific points or regions in the terrain in a plurality of directions that include at least two opposite directions and further comprising possible movement directions and possible directions of approach and departure of the vehicle at the specific points or regions and along the specific regions thereof,
    a routing module configured to derive, based on the vectorial dynamic physical traversability map of the terrain, at least one route through the terrain, and
    a graphical user interface configured to display, upon the at least one image of the terrain, the at least one route according to the movement directions thereof;
    wherein the physical traversability module is further configured to determine the physical traversability measures, further based on the captured terrain-related data; and
    wherein the physical traversability module is further arranged to apply a full physical simulation of a vehicle's motion through the whole at least one route using the predetermined vehicle physical dynamic model and based on the at least one classified image of the terrain, the terrain topography and the given vehicle dynamic parameters, to thereby determine a route information concerning the physicality of the vehicle's motion along the at least one route.

2. The navigation system of claim 1, wherein the terrain-related data further comprises at least one of: a received image, three dimensional reconstruction data, a heights map, infrared data, hyperspectral data, radar data, synthetic aperture radar (SAR) data and vector data relating to the terrain.

3. The navigation system of claim 1, further configured to define terrain types by applying machine learning procedures.

4. The navigation system of claim 1, further comprising a movement planner, configured to receive a user movement intention through the terrain and suggest a movement plan comprising a plurality of routes derived by the routing module with respect to specified vehicle parameters and specified constraints.

5. The navigation system of claim 1, wherein the at least one route is a single user-specified route.

6. The navigation system according to claim 1, wherein the physical traversability module is further configured to update the vectorial dynamic physical traversability map in real-time, based on at least one of: real-time updates of the terrain topography, and real time user interactions.

7. The navigation system according to claim 1, wherein the terrain-related data provided to the classifier is the terrain-related data captured by the sensor.

8. The navigation system of claim 1, wherein the routing module is configured to derive the at least one route through the terrain further based on user definitions comprising groups of vehicles of different types for which the corresponding at least one route is planned.

9. A navigation method through a terrain, the method comprising:
   receiving a terrain-related data comprising at least one image of a terrain;
   determining, based on the at least one image of the terrain, at least one classified image of the terrain comprising multiple patches of classified pixels, wherein each patch of classified pixels of the multiple patches of classified pixels is represented as a specific class of a specified number of classes associated with predetermined physical parameters of the respective class;
   generating, based on the at least one classified image of the terrain, a terrain topography and given vehicle dynamic parameters, and using a predetermined vehicle physical dynamic model comprising vehicle behavior patterns associated with the physical parameters, a vectorial dynamic physical traversability map of the terrain comprising physical traversability measures of specific points or regions in the terrain in a plurality of directions that include at least two opposite directions and further comprising possible movement directions and possible directions of approach and departure of the vehicle at the specific points or regions and along the specific regions thereof;
   deriving, based on the vectorial dynamic physical traversability map of the terrain, at least one route through the terrain comprising movement directions at specific points or regions in the terrain, and
   utilizing a full physical simulation of a vehicle's motion to the whole at least one route, using the predetermined vehicle physical dynamic model and based on at least one classified image of the terrain, the terrain topography and the given vehicle dynamic parameters, to thereby determine a route information concerning the physicality of the vehicle's motion along the at least one route,
   capturing terrain-related data via a vehicle-mounted sensor, and
   determining the physical traversability measures further based on the captured terrain-related data.

10. The navigation method of claim 9, wherein the terrain-related data comprises at least one of: a received image, three dimensional reconstruction data, a heights map, infrared data, hyperspectral data, radar data, synthetic aperture radar (SAR) data and vector data relating to the terrain.

11. The navigation method of claim 9, wherein the classification of pixels is carried out pixel-patch-wise.

12. The navigation method of claim 9, further comprising receiving image data from a plurality of sources and incorporating the received image data into the received image.

13. The navigation method of claim 9, further comprising defining terrain types by applying machine learning procedures to the terrain-related data.

14. The navigation method of claim 9, wherein the vectorial dynamic physical traversability map is further carried out with respect to a local height map and a level of moisture.

15. The navigation method of claim 9, further comprising displaying, upon at least one image of the terrain, the at least one route according toll the flat least one physical traversability measure.

16. The navigation method of claim 9, further comprising calculating a movement plan with the derived routes according to a received user movement intention through the terrain, specified vehicle parameters and specified constraints.

* * * * *